United States Patent [19]

Kerr et al.

[11] Patent Number: 5,552,472
[45] Date of Patent: Sep. 3, 1996

[54] FABRIC CONTAINING GRAFT POLYMER THEREON

[75] Inventors: Richard C. Kerr, Rutherfordton, N.C.; John R. Damewood; Jill Menzel, both of Spartanburg, S.C.; Paul Thottathil, New Hyde Park; Mohan L. Sanduja, Flushing, both of N.Y.

[73] Assignee: Reeves Brothers, Inc., Spartanburg, S.C.

[21] Appl. No.: 372,733

[22] Filed: Jan. 13, 1995

Related U.S. Application Data

[62] Division of Ser. No. 828,082, Jan. 30, 1992, Pat. No. 5,407,728.

[51] Int. Cl.[6] ........................................ J08J 3/02
[52] U.S. Cl. .................. 524/500; 524/501; 524/523; 524/533; 525/14; 525/17; 525/309; 525/310; 525/454; 525/455
[58] Field of Search ........................ 524/500, 533, 524/523, 501; 525/14, 17, 454, 455, 309, 310

[56] References Cited

U.S. PATENT DOCUMENTS

| | | | |
|---|---|---|---|
| 2,721,811 | 10/1955 | Dacey et al. | 117/65 |
| 2,845,689 | 8/1958 | Renold et al. | 28/80 |
| 3,036,948 | 5/1962 | Danielson | 156/330 |
| 3,111,448 | 11/1963 | Tawney | 161/92 |
| 3,188,165 | 6/1965 | Magat et al. | 8/115.5 |
| 3,236,584 | 2/1966 | Degering | 8/116 |
| 3,236,923 | 2/1966 | Degering | 264/22 |
| 3,250,642 | 5/1966 | Parasacco et al. | 117/93.31 |
| 3,250,823 | 5/1966 | Zeitlin | 260/857 |
| 3,252,848 | 5/1966 | Borsellino | 156/307 |
| 3,297,471 | 1/1967 | Traumann | 117/62.1 |
| 3,308,098 | 3/1967 | Nemes et al. | 260/70 |
| 3,353,988 | 11/1967 | Wolinski | 117/47 |
| 3,360,394 | 12/1967 | Griffin et al. | 117/63 |
| 3,400,187 | 9/1968 | Farrow | 264/137 |
| 3,418,066 | 12/1968 | Caldwell et al. | 8/115.5 |
| 3,458,350 | 7/1969 | Barton et al. | 117/161 |
| 3,470,928 | 10/1969 | Schwartz | 150/1 |
| 3,473,956 | 10/1969 | McIntyre et al. | 117/138.8 |
| 3,476,581 | 11/1969 | Weitzel et al. | 117/62 |

(List continued on next page.)

FOREIGN PATENT DOCUMENTS

| | | |
|---|---|---|
| 3196-771 | 8/1988 | Japan . |
| 3085-164 | 4/1998 | Japan . |
| 1017153 | 1/1966 | United Kingdom . |

OTHER PUBLICATIONS

Mileo et al., "Grafting of Methylmethacrylate on Cellulose by Means of Peracids in the Presence of Cupric and Ferric Ions as Catalysts," *J. Polymer Sci. A–1*, 1966, pp. 713–716 (abstract).

Skwarski et al., "Modification of Polyvinyl Alcohol Fibres by Redox–initated Grafting of Vinyl Polymers. I," *Polimery*, 1968, pp. 497–500 (abstract).

Haworth et al., "Polymerisation of Some Vinyl Compounds in Polyamide Fibres," Communications, 1966.

*Primary Examiner*—James J. Bell
*Attorney, Agent, or Firm*—Pennie & Edmonds

[57] ABSTRACT

A solution for forming a graft substrate containing a graft initiator, a catalyst for activating the graft initiator, a first component of water dispersable polymer and a second component of a monomer, each of which includes a functional group for reaction with an activated site on the substrate for grafting thereto and water. A method for grafting at least one of the components to a fiber, yarn or fabric substrate is also disclosed wherein increased flame retarding and yarn integrity is achieved while simultaneously allowing control of fabric porosity. This method does not significantly reduce fabric pliability as compared to uncoated fabric. Furthermore, the graft component may be selectively applied polymer to produce a preferred porosity range or a cutting pattern for the fabric substrate. A fabric, a portion of which includes a graft component or components thereon, forms another embodiment of the invention.

11 Claims, 2 Drawing Sheets

U.S. PATENT DOCUMENTS

| | | | |
|---|---|---|---|
| 3,483,073 | 12/1969 | Pounder et al. | 161/190 |
| 3,545,911 | 12/1970 | Papero et al. | 8/115.5 |
| 3,557,039 | 1/1971 | McIntyre et al. | 260/29.2 |
| 3,630,657 | 12/1971 | Setzer | 8/115.5 |
| 3,664,979 | 5/1972 | Tanomura et al. | 260/75 NK |
| 3,666,400 | 5/1972 | Lofton et al. | 8/115.6 |
| 3,672,975 | 6/1972 | Arons | 117/118 |
| 3,684,770 | 8/1972 | Meisert et al. | 260/75 NP |
| 3,698,931 | 10/1972 | Horowitz | 117/47 R |
| 3,705,645 | 12/1972 | Konen | 206/46 R |
| 3,716,391 | 2/1973 | Hosoda et al. | 117/47 A |
| 3,725,177 | 4/1973 | Vecellio et al. | 156/333 |
| 3,755,498 | 8/1973 | Dickason et al. | 260/873 |
| 3,799,574 | 3/1974 | Bonn et al. | 280/150 AB |
| 3,800,375 | 4/1974 | Harper, Jr. et al. | 28/72.16 |
| 3,822,996 | 7/1974 | Lofquist et al. | 8/165 |
| 3,826,769 | 7/1974 | Carlson | 260/29.2 TN |
| 3,842,583 | 10/1974 | Gage | 57/140 R |
| 3,875,118 | 4/1975 | Meisert et al. | 260/75 NP |
| 3,888,504 | 6/1975 | Bonn et al. | 180/150 AB |
| 3,892,425 | 7/1975 | Sakairi et al. | 280/150 AB |
| 3,910,759 | 10/1975 | Sthare et al. | 8/115.7 |
| 3,937,488 | 2/1976 | Wilson et al. | 280/150 AB |
| 3,956,144 | 5/1976 | Hay | 252/8.8 |
| 3,974,321 | 8/1976 | Baron, Jr. et al. | 428/395 |
| 4,002,801 | 1/1977 | Knechtges et al. | 428/474 |
| 4,003,701 | 1/1977 | Brickman | 8/115.6 |
| 4,020,209 | 4/1977 | Yuan | 428/257 |
| 4,034,138 | 7/1977 | Babayan | 428/378 |
| 4,035,531 | 7/1977 | Lark | 427/390 R |
| 4,039,499 | 8/1977 | Steigelmann et al. | 260/29.6 NR |
| 4,045,510 | 8/1977 | Login | 260/830 P |
| 4,049,862 | 9/1977 | Lindemann | 428/253 |
| 4,065,598 | 12/1977 | Takahashi et al. | 428/394 |
| 4,146,667 | 3/1979 | Stannard | 428/262 |
| 4,150,946 | 4/1979 | Neel et al. | 8/115.6 |
| 4,201,824 | 5/1980 | Violland et al. | 428/262 |
| 4,212,649 | 7/1980 | Sakurada et al. | 8/115.5 |
| 4,259,457 | 3/1981 | Login | 525/39 |
| 4,263,337 | 4/1981 | Login | 427/54.1 |
| 4,263,370 | 4/1981 | Login | 428/395 |
| 4,289,683 | 9/1981 | Neubert | 260/38 |
| 4,315,847 | 2/1982 | Login et al. | 260/45.7 PH |
| 4,315,969 | 2/1982 | Login et al. | 428/395 |
| 4,335,185 | 6/1982 | Adelman et al. | 428/361 |
| 4,346,139 | 8/1982 | Osawa et al. | 428/252 |
| 4,374,176 | 2/1983 | Aoki et al. | 428/392 |
| 4,386,127 | 5/1983 | Tanaka et al. | 428/91 |
| 4,394,128 | 7/1983 | Morris | 8/138 |
| 4,394,493 | 7/1983 | Bartkovitz et al. | 525/530 |
| 4,413,391 | 11/1983 | Renjilian et al. | 28/166 |
| 4,421,826 | 12/1983 | Ohlson et al. | 428/394 |
| 4,425,395 | 1/1984 | Negishi et al. | 428/196 |
| 4,429,000 | 1/1984 | Naka et al. | 428/265 |
| 4,430,089 | 2/1984 | Toy et al. | 8/115.5 |
| 4,433,017 | 2/1984 | Goto et al. | 528/45 |
| 4,434,200 | 2/1984 | Fash et al. | 428/257 |
| 4,448,839 | 5/1984 | Morris | 428/267 |
| 4,452,850 | 6/1984 | Even et al. | 428/252 |
| 4,454,191 | 6/1984 | von Blücher et al. | 428/244 |
| 4,455,341 | 6/1984 | Harteman | 428/225 |
| 4,476,182 | 10/1984 | Fink et al. | 428/265 |
| 4,477,525 | 10/1984 | Login | 428/395 |
| 4,483,900 | 11/1984 | Goldfarb | 428/262 |
| 4,533,594 | 8/1985 | Buchanan | 428/236 |
| 4,558,097 | 12/1985 | Lofquist et al. | 525/183 |
| 4,619,864 | 10/1986 | Hendrix et al. | 428/240 |
| 4,631,066 | 12/1986 | Minemura et al. | 8/115.56 |
| 4,689,264 | 8/1987 | Fink et al. | 428/290 |
| 4,695,509 | 9/1987 | Cordova et al. | 428/267 |
| 4,726,968 | 2/1988 | Hayashi et al. | 427/342 |
| 4,741,740 | 5/1988 | Davis et al. | 8/490 |
| 4,743,267 | 5/1988 | Dyer | 8/194 |
| 4,749,378 | 6/1988 | Cates et al. | 8/130.1 |
| 4,750,911 | 6/1988 | Hansen et al. | 8/584 |
| 4,752,300 | 6/1988 | Johnson | 8/584 |
| 4,758,465 | 7/1988 | McKinney et al. | 428/252 |
| 4,782,175 | 11/1988 | Wehowsky et al. | 560/26 |
| 4,801,405 | 1/1989 | Yamada et al. | 252/609 |
| 4,803,116 | 2/1989 | Amano et al. | 428/286 |
| 4,812,144 | 3/1989 | Hansen | 8/584 |
| 4,814,222 | 3/1989 | Davis et al. | 428/229 |
| 4,853,279 | 8/1989 | Shibata et al. | 428/267 |
| 4,868,041 | 9/1989 | Yamagishi et al. | 428/254 |
| 4,894,428 | 1/1990 | Thoma et al. | 528/45 |
| 4,921,735 | 5/1990 | Bloch | 428/34.9 |
| 4,927,698 | 5/1990 | Jaco et al. | 428/198 |
| 4,937,123 | 6/1990 | Chang et al. | 428/96 |
| 4,963,412 | 10/1990 | Kokeguchi | 428/137 |
| 4,966,725 | 10/1990 | Singer et al. | 252/8.8 |
| 4,999,869 | 3/1991 | Holland et al. | 8/115.62 |
| 5,010,663 | 4/1991 | Thornton et al. | 38/52 |
| 5,011,183 | 4/1991 | Thornton et al. | 280/743 |
| 5,024,875 | 6/1991 | Hill et al. | 428/267 |
| 5,026,596 | 6/1991 | Saotome | 428/264 |
| 5,046,759 | 9/1991 | Enniss et al. | 280/743 |
| 5,057,121 | 10/1991 | Fitzergald et al. | 8/133 |
| 5,061,763 | 10/1991 | Moss, III et al. | 525/502 |
| 5,066,521 | 11/1991 | Morsy | 427/387 |
| 5,068,135 | 11/1991 | Zavatteri et al. | 427/439 |
| 5,073,418 | 12/1991 | Thornton et al. | 428/34.9 |
| 5,073,442 | 12/1991 | Knowlton et al. | 428/276 |
| 5,093,163 | 3/1992 | Krummheuer et al. | 428/35.1 |
| 5,164,253 | 11/1992 | Greatz | 428/245 |

FABRIC CONTAINING GRAFT POLYMER THEREON

This is a division of application Ser. No. 07/828,082, filed Jan. 30, 1992, now U.S. Pat. No. 5,407,728.

TECHNICAL FIELD

The present invention relates to the field of graft polymer coatings, especially as applied to nylon and polyester yarn, fibers, woven and non-woven fabrics.

BACKGROUND OF THE INVENTION

In recent years, automotive manufacturers have begun to increase the utilization of air bag safety devices in their vehicles. Therefore, there has been a continuing effort to improve the safety, performance and durability of these life-saving devices.

An automotive air bag is comprised of an inflatable/deflatable bag, an inflation device, and an impact sensor. Inflation is most often provided by a sodium azide propellant positioned within the inflation device which is ignited in response to activation by an impact sensor. The combustion of this propellant yields nitrogen gas to provide rapid (about 0.2–0.5 sec) inflation of an air bag. Inflation is followed immediately with a deflation cycle. Without such an immediate deflation, the impact of a passenger upon the air bag itself could cause substantial injury.

One means of providing a deflation function for an air bag is to provide for partial air bag gas porosity. Currently, this approach is provided by utilizing a porous air bag made of uncoated fabric or non-porous fabric with vents. When utilizing such fabrics, it is required that the exhaust rate of the air bag fabric be less than the inflation rate after propellant ignition, otherwise a positive pressure would not occur within the bag. The entire inflation/deflation cycle spans approximately 0.6 seconds.

There is concern regarding several problems associated with the partial air bag porosity approach as it applies to current art on passenger and/or driver side air bags. The primary concerns centers upon the possibility that fabric yarn distortion or separation may compromise the inflation cycle. These conditions can result in an unequal volume fill of the bag, higher than acceptable gas leak rate at areas of distortion or separation, or jet stream effects that result in improper bag registration at the peak of the inflation event.

Fabric coatings have been used to provide a certain degree of yarn stability to air bag material but, at the same time, such coatings severely decrease bag porosity and increase cost. It would be highly advantageous to have an air bag material that would maintain yarn integrity during air bag inflation while providing the required air bag porosity.

The inflation/deployment of a driver side air bag: for example is both rapid (about 0.2 seconds) and aggressive, reaching a static pressure of 3 to 5 psi. The impact of the driver upon an air bag increases internal air bag pressure to from about 9 to 12 psi. It is extremely important during the deployment cycle that sewn seams utilized to fabricate the bag are not compromised. It has been demonstrated that a weakness of sewn seams due to defective workmanship, fabric construction, or treatments/coatings, to fabric substrates or untreated fabric substrates could result in a condition referred to as "combing" where separation between the fibers occurs adjacent to the seam.

Stress separation during inflation and impact events resulting in separation or yarn pull-out could compromise the air bag performance or lead to catastrophic failure of the bag and/or secondary injury to the driver or passenger.

It would therefore be highly advantageous to provide an air bag fabric substrate capable of maintaining the integrity of sewn seams during packaging, compaction (for module positioning), and inflation. Preferably, such a substrate would also possess sewn seams which are capable of withstanding yarn pull-out or other catastrophic failure throughout its service life.

It is essential to provide high pliability in an air bag fabric to facilitate packageability. Furthermore, inflation time during an inflation event depends, in part, upon air bag pliability. Less pliable fabrics increase resistance to an air bag deployment resulting in a longer inflation event. Inflation times are specific to a given vehicle specification in order to provide maximum protection for the driver or passenger. It would be advantageous for a coated air bag fabric to exhibit substantially the same pliability as an uncoated air bag fabric.

Air bags are often fabricated from multiple patterns of coated or un-coated material which are sewn, bonded, or sewn and bonded. Once inflated, this manufacturing process provides a pre-selected air bag shape in accordance with interior cabin architecture and the position of the driver or passenger.

When air bag patterns are made from loom state or finished fabrics such as nylon or polyester, difficulties are encountered. These materials have a tendency to distort or fray during conventional pattern cutting operations. To avoid these problems, laser technology or hot melt dies have been employed. Since economy and high through-put are of high priority in enabling universal availability of air bags in automobiles, it would be highly desirable to provide a method for treating fabrics (such as nylon and polyester), so as to minimize fraying and distortion (filament separation in the yarn or yarn separation from the fabric). Such a method would allow economical, conventional pattern cutting technology to be utilized and would thereby help reduce the cost of air bag manufacture.

As discussed above, the inflation of an air bag is most commonly provided by the ignition of a sodium azide propellant. The ignition of this propellant results in a highly exothermic reaction. Design considerations demand that the temperature of nitrogen gas formed by this reaction be rapidly cooled in order to prevent damage to the air bag or facial injuries to the occupant. Current air bag inflators are efficient at reducing gas temperature; however, there are still risks associated with pyrotechnic damage to the air bag. Bag damage, secondary injury, or catastrophic failure of the air bag are all potential risks which must be addressed.

1. Particulate matter (cinders)—Inflator designs include primary and secondary filter medias for the purpose of capturing solid matter resulting from the rapid combustion of the solid fuel. The efficiency of the filters are quite high; however, the potential exists for hot cinders to be propelled into the environment of the bag resulting in microscopic "pitting" of the fabric substrate. This occurrence, in itself, may not necessarily result in a decrease of the bag's performance. However, there is concern that the temperature of the cinders could ignite the fabric substrate if it does not have a measurable degree of flame retardancy.

2. Bag/manifold junctions—Air bag assemblies are normally attached to an inflator housing by means of several coated gaskets and metal "O" rings. The gaskets serve as insulators between the housing and air bag material. Since the ignition of an inflator's solid fuel results in exothermic reaction temperatures of from about 1200° to 1400° F., the bag/manifold junction posses a risk of transferring excessive, potentially ignition-producing heat to the air bag material. Therefore, it is of the greatest importance that the air bag fabric substrate exhibit flame retardancy.

3. Deflation drape—After an air bag deployment event, the bag will lose gas pressure and deflate and assume a limp vertical hang position from the inflator housing. In this position, it is possible for the air bag fabric to come in direct contact with hot metal parts of the inflator housing. As described above, failure of the fabric to exhibit a measurable degree of flame retardancy could result in ignition of the air bag substrate.

In view of these potential fire hazards, it would be highly desirable for the air bag to possess increased flame resistance without compromising other required air bag performance features such as permeability and pliability.

An automotive air bag system must be designed so as to endure a wide range of environmental conditions without compromise of function or performance. Air bag designs or methods must provide an air bag which is functional at environmental extremes as defined by current automotive standards for performance. Air bag fabrics must also not support microbial growth, demonstrate appreciable changes in base physical properties, show appreciable change in pliability, or compromise static and dynamic requirements of the air bag when conditioned over any given environmental event.

What is needed is a vehicular air bag comprised of a fabric exhibiting increased structural integrity effectively reducing yarn distortion, pull-out and related stress failures while also providing increased resistance to seam failure and combing. Furthermore, it would be highly advantageous to provide an air bag fabric which could be effectively die-cut without filament or yarn pull-out or fraying, or fabric distortion. It would be further advantageous to provide improved flame retardance in an air bag.

SUMMARY OF THE INVENTION

The present invention relates to a method for grafting a polymer onto filaments, yarns or fabric substrates formed therefrom to facilitate manufacture of the fabric substrates into final products, such as air bags. One aspect relates to a method for making a fabric substrate which comprises grafting a first component onto filaments or yarns and forming a fabric of the grafted filaments or yarns to obtain a fabric having increased resistance to fraying and filament or yarn pull-out or distortion during manufacture or use compared to fabrics containing non-grafted filaments or yarns.

The first component may be grafted onto filaments during a spin finishing operation and thereafter formed into the fabric. In addition, yarns may be formed from the grafted filaments, and thereafter, the yarns are formed into the fabric. Alternatively, the yarns may be formed from non-grafted filaments, the first component is then grafted onto the yarns, and thereafter, the yarns are formed into the fabric.

It is also possible to beam the yarns and then graft the first component onto the beamed yarn during a slashing operation, or to beam the grafted yarns prior to forming the fabric. Furthermore, it is possible to repackage the grafted yarns and then utilize the repackaged yarns as wrap or fill yarns during formation of the fabric.

The first component may also be grafted onto staple and the grafted staple is then spun into yarn. Instead, the grafted filaments may be cut into staple and the staple then spun into yarns. The filaments or yarns may be contacted with a solution of the first component by a dipping, spraying, or coating operation.

It is advantageous to calendar the fabric to decrease the gas permeability properties thereof. Preferably, the filaments or yarn may be polyamide, polyester, or polyaramid material or mixtures thereof.

A second component may be grafted onto the filaments or yarns, or onto the first component. The first component may be a water dispersible polymer while the second component may be a monomer having a molecular weight of about 1200 or less. Also, a flame retardant agent may be added to the fabric to increase its flame retardancy. In addition, an antioxidant, antiozonant or other stabilizer can be added to the fabric to increase its resistance to aging, high temperature induced degradation or discoloration.

Another embodiment of the invention relates to a method for making a fabric which comprises forming a fabric of filaments or yarns in a predetermined configuration; formulating a solution of a graft initiator for activating sites on the filaments or yarns, a catalyst for activating the graft initiator, and a first component that has a functional group for reaction with an activated site on the filaments or yarns, and water; and contacting the solution with selected portions of the fabric thereby grafting the first component to the filaments or yarns to provide a fabric having increased resistance to distortion, fraying and filament or yarn pull-out during manufacture or use thereof.

The solution may be selectively applied to the fabric to obtain a desired gas permeability range for the graft fabric. Also, the solution may be selectively applied only to those portions or areas of the fabric which will be subject to sewing or mechanical cutting to prevent or reduce fraying or tearing of the fibers or yarns during the sewing or cutting operations. The selective application is achieved by contacting the fabric with the solution of the first component by a spraying, printing, or coating operation. Thus, the fabric may be mechanically sewn or cut into a predetermined pattern.

The present invention also relates to a fabric substrate produced by the previously described methods. In one aspect, such a fabric would include a plurality of filaments or yarns which include first and/or components grafted thereto. Alternatively, the fabric would have grafted filaments or fibers only in preselected areas. In either case, the fabric will have a degree of filament or yarn integrity which allows the fabric to be sewn or mechanically cut with improved resistance to the fraying, filament or yarn pull-out or distortion compared to fabric containing non-grafted filaments or yarns.

Yet another embodiment of the invention relates to a solution for forming a grafted substrate comprising a graft initiator for activating sites on a substrate having active hydrogens; a catalyst for activating the graft initiator; a first component which includes a functional group for reaction with an activated site on the substrate for grafting the first component thereto and for forming an active site on the first component; and a second component which includes a functional group for reacting with an activated site on the substrate or the first component and for forming an active site on the second component. The first and second components are grafted onto the substrate when contacted by the solution to form a grafted substrate; and one of the first and second components comprises a polymer which imparts increased integrity to the grafted substrate while the other component comprises a monomer which imparts increased flexibility or pliability to the grafted substrate.

A preferred first component is a water dispersible polymer of an aliphatic or aromatic polyurethane having sufficient soft segments to provide a predetermined pliability to the fabric substrate or of a thermoplastic, or a natural or synthetic elastomer such as polyvinyl chloride or neoprene. A preferred second component is a water dispersible monomer having a molecular weight of about 1200 or less, such as an acrylate, diacrylate or methacrylate.

DETAILED DESCRIPTION OF THE INVENTION

It is known in the art that both natural and synthetic fibers are utilized in the formation of fabric material. Staple is a relatively short fiber which must be spun into a yarn. Filament may also be spun into yarn. However, longer synthetic filaments may by used as a monofilament for forming fabric directly.

The method of the present invention contemplates contacting fibers and yarns with a grafting solution at any stage of yarn or fabric production. Thus, the grafting solution may be applied to staple or filament fibers, yarns or formed fabric.

As discussed above, the grafting solution may be applied selectively to yarn utilized either for the warp or the weft of a formed fabric. Generally, warp yarns run in a machine direction while a weft or filling yarns run across the machine direction.

It is still further contemplated that the fibers or yarns may be contacted with graft solution either before or after chemical or mechanical production operations such as spin finishing, application of lubricants, or sizing. Furthermore, the graft solution may be applied to the yarns or fibers after formation of a fabric therefrom. The fabric may be contacted with grafting solution either before, during, or after chemical and mechanical finishing operations such as the application of fabric softeners or calendaring operations. The terms fiber, yarn, filament, staple and fabric are well known to those skilled in the textile art. Also, the finishing and treatment operations referred to above are well known. However, each of these terms and operations are described in the McGraw-Hill Encyclopedia of Science & Technology, 6th Edition, vol 18, pages 246–254, which is hereby expressly incorporated by reference.

The grafting of the first component or the first and second component onto filaments or yarns either before or after forming an air bag fabric allows for the manufacture of an air bag fabric providing a reduced fabric porosity as compared to fabric substrate which has not been grafted. Furthermore, grafted filament and yarns form a fabric achieving increased structural integrity such as resistance to pull-out, distortion and increased seam strength.

Air bag fabric made in accordance with the methods of the present invention provide increased ease of manufacture since increased fabric integrity allows mechanical die-cutting without fabric distortion, pull-out and related defects. Furthermore it has been found that air bag fabric made in accordance with the methods of the present invention exhibit pliability which is similar to an untreated or uncoated fabric substrate.

The methods of the present invention require a grafting solution comprised of water, a catalyst for activating a graft initiator in the presence of the fibers or yarns, a graft initiator which, upon activation by the catalyst renders the fibers or yarns receptive to bonding with a first component by producing an active site on the fibers or yarns, and at least one first component having a functional group that reacts with and bonds to the fibers or yarns at the active site thereon. When the grafting solution contains a second component, covalent bonding of the first and second components or bonding of the second component with an active site on the fibers or yarns occurs when the grafting solution contacts the fibers or yarns. It is preferred that the first component comprises at least one water dispersible polymer which includes at least one functional group, e.g., a carboxyl, hydroxyl, $NH_2$, or acrylic group. Water dispersible polyurethane polymers are especially preferred. These polymers are ideally suited for incorporation into the present grafting solution since they may include, as discussed below, sufficient soft segments so as to result in a highly flexible graft polymer, and thus a pliable air bag fabric.

It is preferred that the second component is at least one monomer having a molecular weight of less than 1200. It is especially preferred that the at least one monomer has a molecular weight of from about 200 to 800. As used in the present specification, the term "monomer" refers to low molecular weight polymer chains of less than 1200 amu. It is most preferred that the grafting solution include at least one monomer having a molecular weight of at least 600. The use of a 600 m.w. monomer in the solution, as is explained in greater detail below, increases the chain length of the graft polymer. As is known to the art, increasing the soft segment polymer length increases polymer "softness" or flexibility.

Acrylic and diacrylic monomers having a functional group such as a carboxyl, hydroxyl or $NH_2$ are especially preferred. These preferred monomers include, for example, hydroxy ethyl or propyl methacrylate, a dimethyl or diethyl amino ethyl acrylate or methacrylate, methyl, ethyl and butyl acrylates and methacrylate, glycidyl methacrylate or mixtures thereof. Diacrylates are especially preferred whereas higher acrylate functionality such as triacrylates may result in undesirable crosslinking.

As discussed above, the grafting solution requires a graft initiator in order to provide an active site on the fibers or yarns for reaction and covalent bonding with the first and/or second component. The graft initiator is selected to abstract an active hydrogen from a substrate filament or yarn to which a graft polymer will be bonded.

Hydrogen abstraction, as discussed below, produces an activated position on a substrate which bonds with the first component. It is preferred that the initiator is a metal ion provided by the ionization of a metal salt. Silver ions provided by the ionization of silver salts are especially preferred although ferrous and ferric ions abstracted from iron salts as well as other metal salts may also be advantageously utilized.

When a silver salt such as silver nitrate, silver perchlorate and silver acetate is utilized to activate the graft initiator, such salts are preferably present in the graft solution in an amount of from about 0.001% to about 0.01% by weight of the solution.

In order to ionize the metal salts to provide an activating metal ion, the graft solution includes a catalyst. A wide variety of catalysts may be utilized in the method of the present invention. Peroxide, peracid, or a perbenzoate are preferred catalysts. Peroxide catalysts of urea, hydrogen and benzoyl peroxides are especially preferred. Specifically, urea peroxide, hydrogen peroxide, benzoyl peroxide, peracetic acid or tertiary butyl perbenzoate are the most advantageous. The catalyst functions to ionize metal salts such as silver or iron salts described above so as to provide silver and iron ion graft initiators. The grafting solution also advantageously includes a flame retardant and an antioxidant, antiozonant or other stabilizer.

In one embodiment of the present invention, the grafting solution additionally comprises from about 3 to 6 parts per weight of an antioxidant, antiozonant or other stabilizer, such as, for example, ultraviolet light (U.V.) stabilizers. Antioxidants of the sterically hindered phenol class such as, for example, Irganox 1076, may be included in the solution. U.V. stabilizers of the amine class may also be added to the grafting solution. It is preferred to utilized sterically hindered amines such as, for example, Tinuvin 292 as a U.V. stabilizer. However, U.V. absorbers of the oxalanilide class, such as, for example, Sanduvor VSU may also be utilized. Thus the grafted substrate is provided with increased resistance to heat, U.V. and age degradation.

A preferred grafting solution comprises by dry weight from about 5 to 45 weight percent of a first component, from about 45 to 5 weight percent of the second component, from about 25 to 65 weight percent of the flame retardant, from about 0.001 to 0.01 weight percent of the catalyst, and from about 0.0001 to 0.001 weight percent of the graft initiator. The grafting solution can operate with as little as 1 weight percent solids and 99 weight percent water, but typically includes from about 5 to about 95 and preferably, about 10 to 60 weight percent water as a vehicle to carry these solids.

In the method of the present invention chemical grafting of a natural or polymeric filament or yarn substrate is initiated with the contact of a graft initiator ("GI") with an "active hydrogen" of the substrate. An active hydrogen is a hydrogen which is relatively easily removed from the substrate by the graft initiator. A tertiary carbon, for example, maintains a weaker covalent bond with a hydrogen atom than a secondary carbon, and that hydrogen atom would be one type of active hydrogen. Other types includes N—H, —OH, —COOH, —COOR—H, etc.

Graft initiators are able to remove:

1. An active hydrogen alone, resulting in the formation of a cation position;
2. An active hydrogen with one electron resulting in a substrate free radical position; or
3. An active hydrogen and both electrons resulting in the formation of an anion position on the substrate.

Although there are many components which do not react with a free radical substrate position, the present invention provides for the production of all three species of activated substrate sites listed above. Therefore, it is possible to use a wide range of monomers, polymers and mixtures thereof which are selected according to the desired properties that they will contribute to the grafted substrate.

As discussed above, the method of the present invention utilizes a grafting solution which includes a first component having a functional group. Optionally, a second component polymer may be included to bond with the first component or directly graft upon the filaments or yarns comprising, or which will comprise, the fabric substrate.

It is especially preferred that the first component be a water dispersible or water based polyurethane such as, for example, an aliphatic polyester polyurethane (Dispercoll 442); aromatic polyurethanes (Witcobond 160 and 170); aromatic polyurethane (Neorex R940) and aliphatic polyurethanes (NeoRez R960, R962); aliphatic polyurethane (Witcobond 232); and aromatic polyester polyurethane (NeoRez R9431).

As discussed above, the second component is preferably a monomer. As used in the present specification, the term "monomer" refers to low molecular weight polymer chains of 1200 m.w. or less and preferably from about 200 to 800 m.w. Monomers especially suited to the practice of the present invention include acrylic monomers including hydroxyl, carboxyl, epoxy, amino, hydride and glycidyl functional groups, i.e., hydroxy ethyl or propyl methacrylate, dimethyl and diethyl amino ethyl acrylates and methacrylate, methyl, ethyl and butyl acrylates and methacrylate, glycidyl methacrylate. Any of the foregoing monomers can be used alone or in combination. Although mono and diacrylates are preferred as the second component, triacrylics should not be used in large amounts because they can cause cross-linking of polymer chains resulting in an undesirable stiffening of the air bag fabric.

The formula below represents a grafting process in accordance with the present invention. $CH_2=CHX$ represents a vinyl component wherein X is a functional group. The first formula below illustrates the formation of a graft polymer in accordance with the methods of the present invention upon a segment of a polypropylene fiber substrate. The tertiary hydrogens represent active hydrogens. The second formula listed below illustrates the abstraction of hydrogen from polypropylene by means of the graft initiator. The asterisk represents either a free radical, an anion or a cation as discussed above. The third formula illustrates covalent bonding of a first component or a second component to the polypropylene fiber substrate. Since the linkage between the grafted polymer and the substrate is covalent, the graft polymer cannot be leached from the substrate.

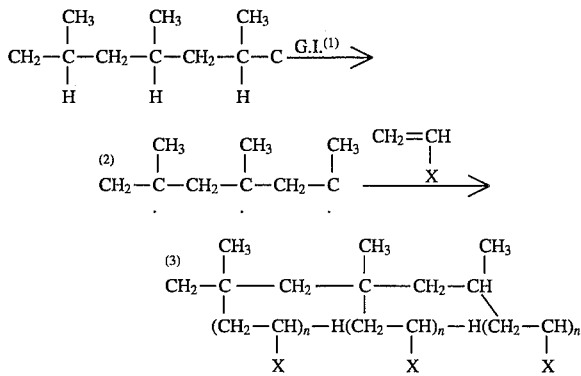

As discussed above, it is important to maintain high pliability in air bag applications. Therefore, the graft polymer method of the present invention must provide a grafted air bag substrate exhibiting similar pliability to an uncoated substrate.

It is known in urethane chemistry that polymer softness can be improved by increasing the length of the soft segment portions of the polymer (simple, linear, alkyl chain sections). See H. Saunders and K. C. Frisch, *Polyurethanes, Chemistry and Technology*, Krieger Publ. Co. 1983, pp. 477 et seq. By analogy, it has now been discovered that by increasing the molecular weight of the second component (which may bond to the first component as a chain extender), or by using a larger molar ratio second component (CH=CHXR chain extender), a flexible graft polymer can be provided. Therefore, a particular chain extender and/or ratio may be preselected for use in a graft polymer solution in accordance with the present method to provide a graft polymer achieving high pliability. Therefore, it is now possible to have pliability in a grafted polymer fabric which is similar to that of uncoated fabric substrate.

By increasing the percentage of monomer (second component) in the grafting solution relative to the first component, a higher percentage of simple, straight chained monomer units will be incorporated into the polyurethane. These relatively linear segments of the polyurethane, known to the art as soft segments, increase the flexibility of the polymer chain. Cyclic and highly branched sections of a polyurethane are known as hard segments and increase chain stiffness. Therefore, by either increasing the amount of monomer incorporated into the polyurethane chain, or by increasing the percentage of monomer/polymer incorporated, increased flexibility of the grafted polymer can be attained. It has been found that a monomer to polymer ratio of about at least 2:1 and preferably 5:1 or more is especially useful for forming a flexible polymer. However, as the ratio of monomer is increased beyond this range, the grafted polymer begins to become tacky and thus undesirable for use on a vehicular air bag fabric. It has also been found that a molecular weight of about 600 is preferred to provide optimum polymer soft segments.

The relative percentages of monomer to polymer will also influence which component grafts directly to the polymer fiber substrate. However, it must also be considered that the relative reactivity of the functional groups incorporated within each component with the substrate will also influence the rate of grafting.

As discussed above, during the graft initiation stage, an active hydrogen is abstracted from a yarn or filament substrate (RH) by a graft initiator (e.g. $Ag^+$).

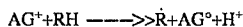

The active site $\dot{R}$ may now react with a first component or a second component in a chain propagation step.

From this stage, the grafted chain extender can (A) react with an adjacent active site $\dot{R}$ terminating chain growth or (B) may react with additional first or second components to form a grafted polymer. As explained above, greater percentage of monomer bonding to the chain will result in a softer polymer.

Chain Termination

A: R—CH$_2$—$\dot{C}$HX +$\dot{R}$ ——>R—CH$_2$—CHX—R

Further Chain Propagation

B: R—CH$_2$—$\dot{C}$HX+(CH$_2$=CHX)$_n$ ——>
R—CH$_2$—CHX—(CH$_2$—CHX)$_{n-1}$—CH$_2$—$\dot{C}$HX Chain Termination R—CH$_2$—CHX—(CH$_2$—CHX$_{n-1}$)—CH$_2\dot{C}$HX+$\dot{R}$ ——>
R—CH$_2$—CHX—(CH$_2$—CHX)$_{n-1}$—CH$^2$—CHX—R As can be seen in stage B illustrated above, further reaction between the chain extenders before termination will result in longer grafted polymers. By providing a relatively large percentage of chain extender (monomer) in a grafting solution formulated in accordance with the methods of the present invention, extended chain propagation occurs incorporating soft segments prior to chain termination. Thus the present method provides a means of obtaining similar pliability to that of an uncoated fabric substrate in a grafted polymer fabric.

The formula sequence illustrated below is representative of the grafting method of the present invention as applied to polyester substrate.

In the case of polyester, the active hydrogen is the hydrogen of the carboxyl group.

1. Radical formation—The active hydrogen may be abstracted by a graft initiator to form a free radical carbonyl group located in the polyester chain.
2. Initiation/extension—The free radical carbonyl group thereafter reacts with either a first component or a second component (e.g. CH$_2$=CH—X), so as to graft the component as a free radical upon the polyester chain.
3. Propagation—the grafted free radical component may now, covalently bond to additional components of the same or different species thereby activating additional components to a free radical state, or
4. Termination—may react with another free radical to terminate the polymerization process. Peroxide, for example may be converted by graft initiator to a free radical state for bonding with activated monomer.

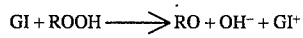

Polyester substrate      Radical formation

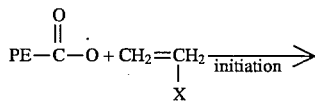 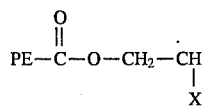

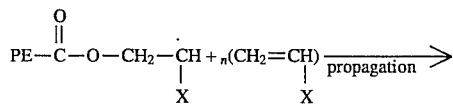

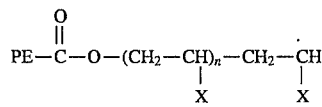

The process may be terminated by radical combination:

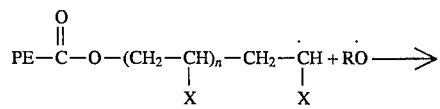

-continued

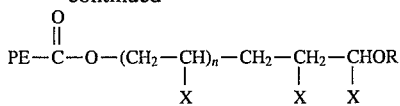

Natural, polyester or nylon fabric may serve as the substrate in accordance with the present invention. The graft initiator abstracts an active hydrogen from the nylon or natural substrate to form a free radical in the same manner as it does for polyester.

In one method of the present invention, polyester or nylon fabric is treated with a solution of a first component water dispersible polyurethane, a second component acrylic monomer, a peroxide catalyst, a silver nitrate graft initiator, a flame retardant, an antioxidant and other ingredients of the composition. The hydroxyl, carboxyl and acrylic groups in the solution polymerize to form a polymeric structure which is chemically bound to the fabric.

The grafting solution is a system that contains selected polymers and monomers along with other ingredients of the formulation.

In one embodiment of the present invention, a predetermined amount of urethane polymer or a combination of urethane polymers is added to monomer(s), catalyst, graft initiator, and other ingredients of the solution. The grafting solution thus prepared is then used to treat polyester or nylon fabric either by dipping, spraying, printing or other methods known in the art. The treated fabric is dried to provide a grafted polymer fabric.

It has now been found that the above described grafting method may be utilized to reduce the gas permeability range of a fabric substrate. Fabric substrate ordinarily exhibit a wide range of gas permeability due to inconsistent fabric integrity. Fabric failures caused by die-cutting, seam failure during inflation or other forces applied to conventional air bag material result in a wide range of fabric porosity. The method of the present invention has been found to increase the structural integrity of the fabric substrate, e.g., by reducing yarn pull-out, distortion and combing. The increased fabric integrity provided by the present invention allows die-cutting to be applied to the grafted fabric without the above-described fabric defects. Thus, increased fabric stability results in a more predictable, reduced range of gas permeability.

In an alternative embodiment of the present invention, the graft polymer solution is selectively applied to those areas of a yarn or filament' substrate along which a pattern cut is to be made to effectively lock yarn fibers together thereby preventing fraying, distortion, or yarn pull-out during conventional pattern cutting.

Selective application of the graft polymer to fabric substrate in accordance with the methods of the present invention may be accomplished by utilizing a rotary screen printing method. Also, discrete spraying devices can effect selective graft application. In addition, a spray head or series of spray heads may be used to deposit a particular graft pattern.

Figure 1:
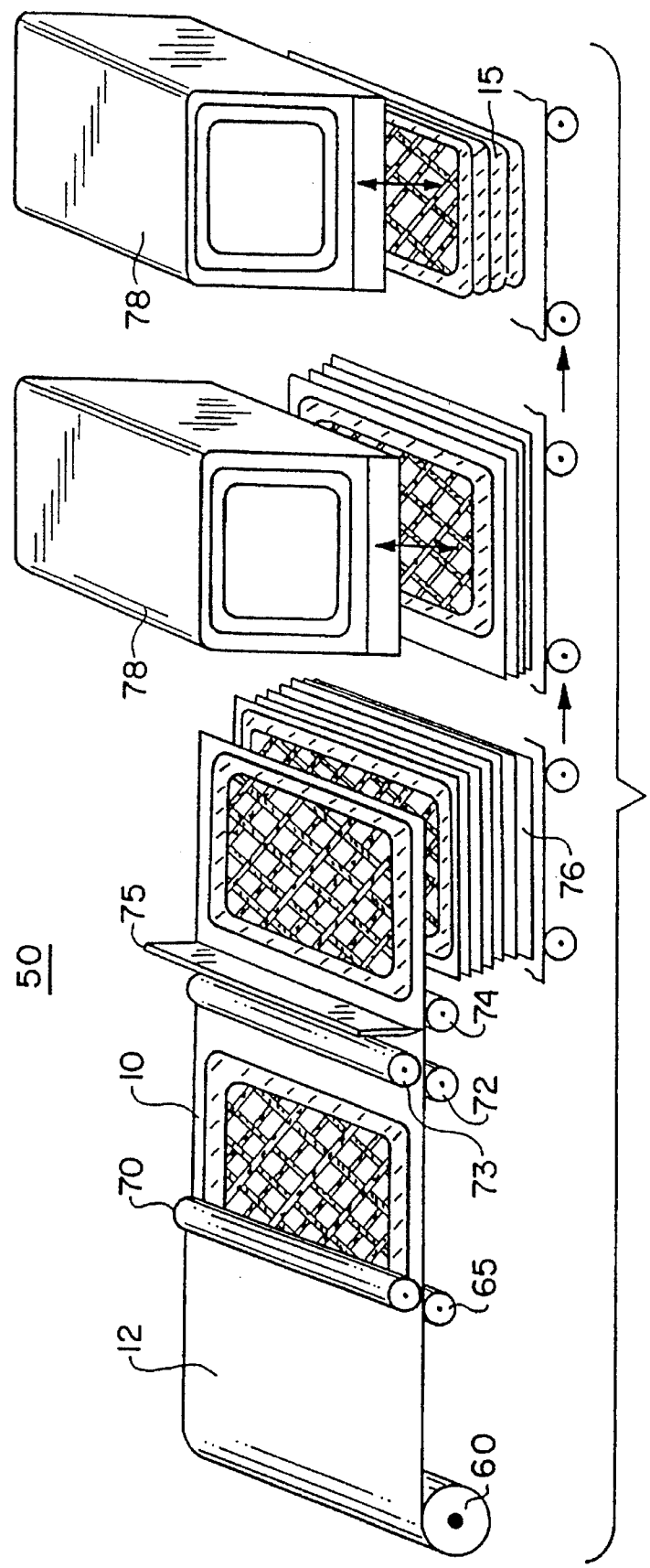
In FIG. 1 there is illustrated a means of applying the graft polymer upon only specific areas of the fabric substrate through the use of a rotary screen printing device 50. First, the fabric substrate 12 is mounted on unwind roll 60 and roll 65 which feeds the fabric to the rotary screen roller 70 which selectively, in a predetermined pattern, applies the grafting composition to the fabric substrate 12. The selectively grafted fabric 10 is then fed on roller 72, 73, and 74 to the cutting station where the knife 75 cuts the selectively grafted fabric at a predetermined length 76. These predetermined lengths 76 are stacked one on top of the other until a predetermined number are stacked as illustrated at 77. The predetermined lengths of selectively grafted fabrics are then transported to a die-cutting station where the die 78 performs the final cutting or trimming operation resulting in a fully trimmed selectively grafted fabric 15 from which the air bag is formed by folding, gluing, bonding and/or stitching into the desired configuration.
Figure 2:
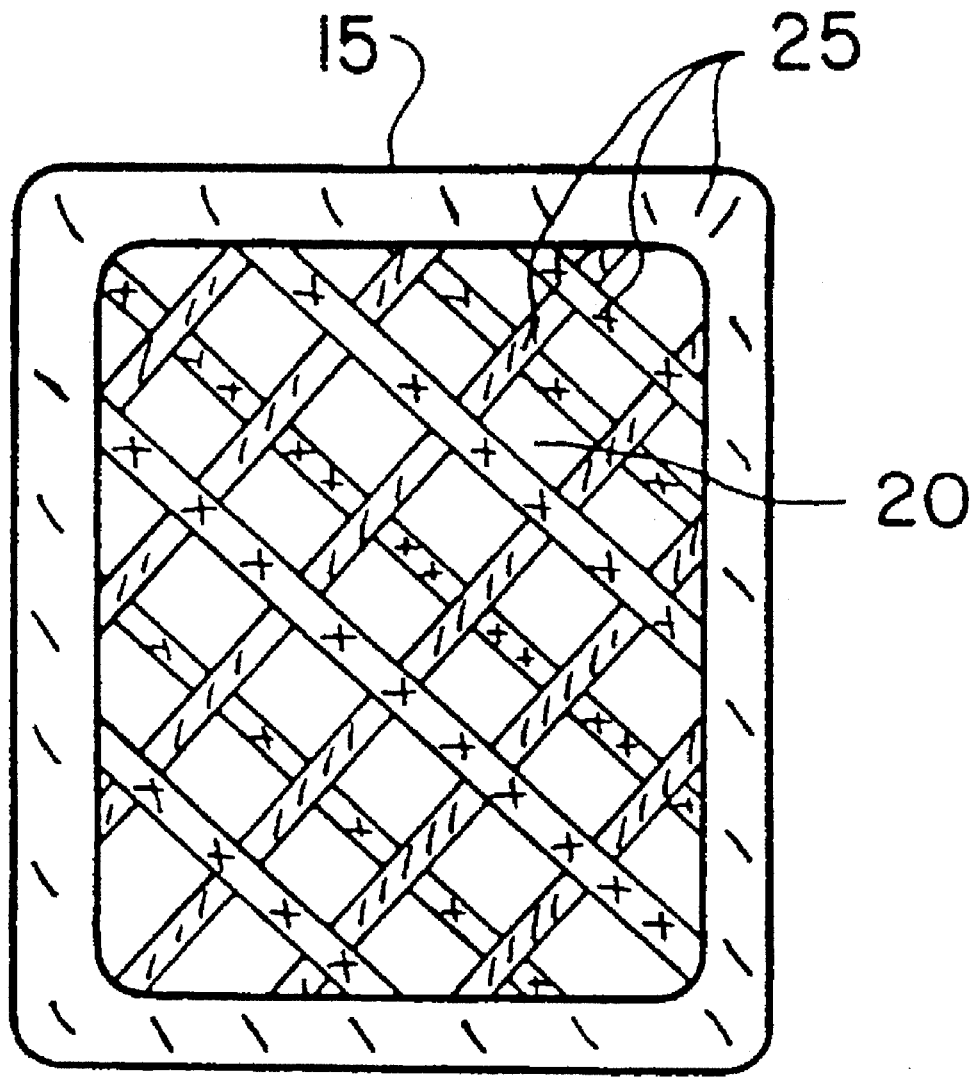
FIG. 2 illustrates a selectively coated fabric 15 which has been selectively coated to construct a coated fabric having a desired overall permeability as well as a permeability rate in certain locations of the fabric that has been selectively prearranged to provide the desired permeability of the final product. The selectively coated fabric 15 has uncoated areas 20 and coated areas 25.

In still another embodiment of the present invention, graft solution is selectively applied to a fabric substrate in order to provide a predetermined pattern for desired gas permeability. Therefore, it is possible to design an air bag having areas of differential inflation and deflation.

The following examples disclose the composition of various graft solutions prepared in accordance with the present invention.

EXAMPLE 1

Five grafting solutions formulated in accordance with the methods of the present invention are illustrated in Table 1. Each of the five grafting solutions were applied to individual nylon fabric substrate samples. The factor varied in the illustrated experiment is the amount of diacrylate monomer included in each subsequent grafting solution test. A description of each of the listed components is indicated in Table 2 below.

After a sufficient time was allowed for drying of the solution treated fabric substrates, the flame resistance, handling and die-cutability of the fabrics were tested. An informal grading system utilizing the symbols "+" equivalent to fully acceptable, "(+)" equivalent to marginal performance, and "–" equivalent to unacceptable performance are listed in Table 1.

As illustrated in Table 1, as the diacrylate is increased relative to the polyurethane and acrylic polymers, the drape of the grafted fabric improves. As discussed above, higher percentages of monomer: first component allows increased percentage of monomer incorporation into a grafted polymer chain. Thus a softer grafted polymer and more pliable grafted fabric will result. A "+" drape notation indicates fabric pliability substantially equal to untreated fabric substrate, e.g. before contacting the fabric with the grafting solution.

As noted in the last two rows of Table 1, the die-cutability of fabrics grafted with each of the five listed solutions was acceptable. Acceptable die-cutability means that the grafted fabric substrate underwent mechanical die-cutting without significant fabric distortion, yarn pull-out or fraying. Furthermore, the flame resistance of all treated fabrics satisfied current automotive industry standards.

TABLE 1

| Test | A | B | C | D | E |
|---|---|---|---|---|---|
| Unocal U-3112 | – | 18 | 18 | 18 | 18 |
| Dispercol U-42 | 150 | 150 | 150 | 150 | 150 |
| SR-252 | 20 | 40 | 60 | 80 | 100 |
| Granguard N | 500 | 500 | 500 | 500 | 500 |
| Water | 1000 | 1000 | 1000 | 1000 | 1000 |
| Urea Peroxide | 2 | 2 | 2 | 2 | 2 |
| Silver nitrate | 1 | 1 | 1 | 1 | 1 |
| Unocal U-1301 | 18 | | | | |
| Drape | – | (+) | + | + | + |
| Flame Resistance | + | + | + | + | + |
| Die-Cut characteristic | + | + | + | + | + |

(Table 1 lists solution components in parts per weight.)

The following examples are preferred grafting solutions for polyester and nylon substrate fabric respectively. Each example is described in terms of parts per weight.

EXAMPLE 2 (POLYESTER FORMULATION)

| Component | Parts |
|---|---|
| Unocal U-3112 | 18 |
| SR-252 | 100 |
| Urea Peroxide | 2 |
| Silver Nitrate | 1 |
| Dispercoll U-42 | 250 |
| Water | 1000 |
| Fyrol 51 (flame retardant) | 300 |

The graft solution of Example 2 is especially adapted for polyester substrates. Fabrics comprised of polyester yarns and filaments contacted with this solution achieved pliability substantially equivalent to untreated substrate, flame resistance satisfying current automotive industry standards, as well as excellent die-cut characteristics. As noted above, the term "die-cut characteristics" or "die-cutability" refers to the ability of a fabric grafted in accordance with the methods of the present invention to undergo mechanical die-cutting without exhibiting substantial yarn pull-out, fraying or other fabric distortion.

EXAMPLE 3 (NYLON FORMULATION)

| Component | Parts |
|---|---|
| Unocal U-3112 | 18 |
| Dispercoll U-42 | 250 |
| SR-252 | 100 |
| Granguard-N | 500 |
| Water | 1000 |
| Urea Peroxide | 2 |
| Silver Nitrate | 1 |

The graft solution of Example 3 is especially adapted for nylon substrate. Fabric comprised of nylon yarns and filament contacted with this solution achieved excellent pliability, flame resistance as well as excellent die-cut characteristics.

Table 2 describes the various trade names utilized in the examples above and below.

TABLE 2

| TRADE NAME | DESCRIPTION |
|---|---|
| Dispercoll U-42 | Water based Polyurethane |
| Unocal U-3112 | Acrylic Prepolymer |
| Unocal U-1301 | Acrylic Prepolymer |
| Neorez R-962 | Water based Polyurethane |
| DC-57 | Silicone Fluid |
| SR-9035 | Alkoxylated Triacrylate |
| SR-344 | Polyethylene glycol Dimethacrylate (400) |
| SR-252 | Polyethylene glycol Dimethacrylate (600) |
| Pyrolux 593 | Flame Retardant (Cyclic Phosphonate Ester) |
| Pyrolux PCS | Flame Retardant (Cyclic Phosphate ester) |
| Haloflex 202 | Flame Retardant (Halogenated Compound) |
| Fyrol 51 | Flame Retardant (Cyclic Phosphonate Ester) |
| Granguard-N | Flame Retardant (Modified Thiourea Formaldehyde) |
| Urea Peroxide | Catalyst |
| Silver Nitrate | Graft Initiator |

EXAMPLE 4

Table 3 below lists 6 grafting solutions formulated (by percentage weight) in accordance with the present invention. Formulations F and G are useful on Polyester substrates. Formulations H, I, J, and K are useful on nylon substrates.

TABLE 3

| | F | G | H | I | J | K |
|---|---|---|---|---|---|---|
| Dispercoll U-42 | 200 | 150 | 200 | 200 | 150 | 150 |
| Unocal U-3112 | 18 | 14 | 18 | 18 | 18 | 18 |
| Neorez R-962 | — | — | 9 | 9 | — | — |
| DC-57 | 1 | 1 | — | — | — | — |
| SR-9035 | 2 | 2 | — | 10 | — | — |
| SR-344 | — | — | 2 | — | — | — |
| SR-252 | — | 0.5 | 2 | 10 | 20 | 100 |
| Pyrolux 593 | — | 160 | — | — | — | — |
| Pyrolux PCS | — | 120 | — | — | — | '3 |
| Haloflex 202 | 160 | — | '3 | — | — | — |
| Granguard-N | — | — | 1000 | 1000 | 500 | 500 |
| Urea Peroxide 1 % | 0.2 | 0.2 | 0.2 | 0.2 | 0.2 | 0.2 |
| Silver Nitrate 0.1% | 0.1 | 0.1 | 0.1 | 0.1 | 0.1 | 0.1 |

EXAMPLE 5

Table 5 illustrates the results of laboratory testing of a grafted polyester air bag fabric utilizing a grafting solution comprised of the formulation, listed in parts by weight in Table 4.

TABLE 4

| | |
|---|---|
| Acrylic propolymer Unocal 2301 | 30 |
| Deionized water | 400 |
| Dow Corning additive DC-57 | 1 |
| Polyurethane dispersion Dispercoll EA 8410 | 1050 |
| Organi phosphonium compound Pyrolux 593 | 130 |
| Ethylene vinyl chloride Airflex U-500 | 35 |
| Polyethylene glycol dimethacrylate SR-252 | 1 |
| Trifunctional methacrylate ester SR-9055 | 0.50 |
| Acrylic Prepolymer Unocal U-2301 | 30 |
| Urea peroxide 1 % sol. | 0.50 |
| Solver nitrate 0.1 % | 0.01 |

TABLE 5

AIR BAG (POLYESTER) LABORATORY TEST RESULTS

| | | |
|---|---|---|
| Flammability (FMVSS 302) | warp | SE |
| | fill | SE |
| Shrinkage % after 24 hours at 100° F. and 95% R.H. (relative humidity) | warp | 0.1 |
| | fill | 0.1 |
| Mildex resistance after 14 days at 100° F. and 95% R.H. | | pass |
| Grab tensile, lbs/in., 10,000 cycles Wyzenbek Abrasion, fabric to fabric | warp | 440 |
| | fill | 362 |
| Tear strength lbs. Trapezoid Method | warp | 81.7 |
| | fill | 70.8 |
| Coated weight, Oz/Yd$^2$ | | 6.46 |
| Gauge, in | | 0.012 |
| Mullen Burst, psi | | 792 |
| Bran Tensile, lbs/in at room temperature | warp | 510 |
| | fill | 479 |
| Elongation at Break, % at R.T. | warp | 28.8 |
| | fill | 37.1 |
| Grab Tensile, lbs/in. After 14 days per T-469 cyclic aging[1] | warp | 467 |
| | fill | 441 |
| Elongation at break % After 14 days per cyclic aging[1] | warp | 30.4 |
| | fill | 33.3 |
| Bow, % | | 0.8 |
| Skew, % | | 1.4 |

[1]First heat to 100° C. (212° F.) for 24 hours, then allow to cool to room temperature; next, cool to −40° C. (−40° F.) for 4 hours, then allow to warm to room temperature. Repeat this cycle 6 times before performing test indicated.

EXAMPLE 6

As discussed above, an antioxidant, antiozonant or other stabilizer is advantageously added to the grafting solution of the present invention in order to increase the heat and/or aging resistance of grafted fibers, yarns or fabrics comprised thereof. Table 6 below illustrates 4 grafting solutions of the present invention, (L, M, N, and incorporation Sanduvor VSU, Tinuvin 292, Irganox 1076 and Triphenyl Phosphate as antioxidants respectively.

TABLE 6

Grafting solutions including antioxidizing agents

| Grafting Solution | L | M | N | O |
|---|---|---|---|---|
| U-3112 | 18 | 18 | 18 | 18 |
| SR-252 | 100 | 100 | 100 | 100 |
| Granguard | 500 | 500 | 500 | 500 |
| Urea Peroxide | 2 | 2 | 2 | 2 |
| Silver Nitrate | 1 | 1 | 1 | 1 |
| Dispercoll U-42 | 250 | 250 | 250 | 250 |
| Water | 1000 | 1000 | 1000 | 1000 |
| Sanduvor VSU | 5 | | | |
| Tinuvin 292 | | 5 | | |
| Irganox 1076 | | | 5 | |
| Triphenyl Phosphate | | | | 5 |

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention. For example, it is within the scope of this invention to apply the grafting solution to a seamless air bag formed from one continuous piece of fabric.

What is claimed is:

1. A solution for forming a grafted substrate comprising an aqueous solution that contains:

a graft initiator comprising a metal ion for activating sites on a substrate having active hydrogens;

a catalyst for activating the graft initiator;

a first component which includes a functional group for reaction with an activated site on the substrate for grafting the first component thereto and for forming an active site on the first component; and a second component which includes a functional group for reacting with an activated site on the substrate or the first component and for forming an active site on the second components;

wherein the first and second components are grafted onto a substrate which includes an active hydrogen and is contacted by the aqueous solution to form a grafted substrate; and one of the first and second components comprises a polymer which imparts increased integrity to the grafted substrate while the other component comprises a monomer which imparts increased flexibility or pliability to the grafted substrate.

2. The solution of claim 1 wherein the first component is a water dispersible polymer.

3. The solution of claim 1 wherein the water dispersible polymer is a polyurethane having sufficient soft segments to provide a predetermined pliability to the fabric substrate.

4. The solution of claim 1 wherein the water dispersible polymer is a polyurethane, thermoplastic, or a natural or synthetic elastomer.

5. The solution of claim 1 wherein the water dispersible polymer is an aliphatic or aromatic polyester polyurethane, polyvinyl chloride, or neoprene.

6. The solution of claim 1 wherein the second component is a water dispersible monomer having a molecular weight of about 1200 or less.

7. The solution of claim 1 wherein the second component is an acrylate or methacrylate compound.

8. The solution of claim 1 wherein the monomer is a diacrylate compound.

9. The solution of claim 1 wherein the solution includes at least one flame retardant agent to increase the flame retardancy of the fabric substrate.

10. The solution of claim 9 wherein the flame retardant agent is a cyclic phosphonate ester, a halogenated compound, a thiourea-formaldehyde compound, or mixtures thereof.

11. The solution of claim 1 wherein the solution includes an antioxidant, an antiozonant or a stabilizer to increase the heat or aging resistance of the fabric.

* * * * *